US010132158B2

(12) United States Patent
Hay (10) Patent No.: US 10,132,158 B2
(45) Date of Patent: Nov. 20, 2018

(54) ROLLER CONE DRILL BIT WITH EMBEDDED GAMMA RAY DETECTOR

(71) Applicant: Halliburton Energy Services, Inc., Houston, TX (US)

(72) Inventor: Richard Thomas Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/524,961

(22) PCT Filed: Dec. 19, 2014

(86) PCT No.: PCT/US2014/071624
§ 371 (c)(1),
(2) Date: May 5, 2017

(87) PCT Pub. No.: WO2016/099564
PCT Pub. Date: Jun. 23, 2016

(65) Prior Publication Data
US 2017/0321536 A1    Nov. 9, 2017

(51) Int. Cl.
*E21B 47/024* (2006.01)
*E21B 10/08* (2006.01)
*G01V 5/04* (2006.01)
*E21B 47/01* (2012.01)
*G01T 1/20* (2006.01)
*E21B 7/04* (2006.01)
(Continued)

(52) U.S. Cl.
CPC ........... *E21B 47/024* (2013.01); *E21B 7/04* (2013.01); *E21B 10/00* (2013.01); *E21B 10/08* (2013.01); *E21B 44/00* (2013.01); *E21B 47/011* (2013.01); *E21B 49/00* (2013.01); *G01T 1/2018* (2013.01); *G01V 1/40* (2013.01); *G01V 5/04* (2013.01); *G01V 5/06* (2013.01)

(58) Field of Classification Search
CPC ...................................................... E21B 47/024
See application file for complete search history.

(56) References Cited

U.S. PATENT DOCUMENTS 4,698,501 A    10/1987 Paske
5,061,849 A    10/1991 Meisner et al.
(Continued)

FOREIGN PATENT DOCUMENTS

WO    2002/082124 A1    10/2002

OTHER PUBLICATIONS

International Preliminary Report on Patentability issued in related Application No. PCT/US2014/071624, dated Jun. 29, 2017 (12 pages).
(Continued)

*Primary Examiner* — David J Bagnell
*Assistant Examiner* — Kristyn A Hall
(74) *Attorney, Agent, or Firm* — Alan Bryson; Baker Botts L.L.P.

(57) ABSTRACT

An example apparatus includes a drill bit body and a leg extending from the drill bit body. A journal may extend from the leg, with a gamma ray detector at least partially within the journal. In certain embodiments, the gamma ray detector may be confined within a pressure protective cavity at least partially within the arm of the journal. In certain embodiments, the gamma ray detector may be a scintillator aligned with at least one of a photomultiplier, photodiodes, or phototransistors.

31 Claims, 8 Drawing Sheets

(51) Int. Cl.
*E21B 10/00* (2006.01)
*E21B 44/00* (2006.01)
*E21B 49/00* (2006.01)
*G01V 1/40* (2006.01)
*G01V 5/06* (2006.01)

(56) References Cited

U.S. PATENT DOCUMENTS

| | | | |
|---|---|---|---|
| 5,134,285 | A | 7/1992 | Perry et al. |
| 5,439,068 | A | 8/1995 | Huffstutler et al. |
| 5,448,227 | A | 9/1995 | Orban et al. |
| 5,720,355 | A | 2/1998 | Lamine et al. |
| 5,742,057 | A | 4/1998 | Frederick et al. |
| 5,753,919 | A | 5/1998 | Prain et al. |
| 5,813,480 | A | 9/1998 | Zaleski, Jr. et al. |
| 6,057,784 | A | 5/2000 | Schaaf et al. |
| 6,307,199 | B1 | 10/2001 | Edwards et al. |
| 6,571,886 | B1 | 6/2003 | Sullivan et al. |
| 6,814,162 | B2 | 11/2004 | Moran et al. |
| 7,168,506 | B2 | 1/2007 | Boucher et al. |
| 7,202,456 | B2 | 4/2007 | Mickael |
| 7,207,215 | B2 | 4/2007 | Spross et al. |
| 8,100,196 | B2 | 1/2012 | Pastusek et al. |
| 8,210,280 | B2 | 7/2012 | Trinh et al. |
| 8,215,384 | B2 | 7/2012 | Trinh et al. |
| 8,455,812 | B2 | 6/2013 | Nikitin et al. |
| 8,461,567 | B2 | 6/2013 | Voutilainen et al. |
| 8,573,327 | B2 | 11/2013 | Trinh et al. |
| 2011/0060527 | A1 | 3/2011 | Teodorescu |
| 2011/0253448 | A1 | 10/2011 | Trinh et al. |
| 2011/0272569 | A1 | 11/2011 | Sinclair et al. |
| 2012/0001761 | A1 | 1/2012 | Voutilainen et al. |
| 2012/0067567 | A1 | 3/2012 | Rytlewski et al. |
| 2013/0048381 | A1 | 2/2013 | Habernal et al. |
| 2013/0068525 | A1 | 3/2013 | DiGiovanni |

OTHER PUBLICATIONS

International Search Report and Written Opinion issued in related PCT Application No. PCT/US2014/071624 dated Aug. 26, 2015, 15 pages.
"ZoneTrak G Near-Bit Gamma Ray", Baker Hughes brochure, 2010, 1 page.
Konstantatos, Gerasimos, et al. "Hybrid graphene-quantum dot phototransistors with ultrahigh gain." Nature nanotechnology 7.6 (2012): 363-368.
DrilTeq Services Brochure—Gamma Sensor, GeoPlex Drilling Technologies, 2014, 22 pages.
Zavaleta, Cristina, "Photodiodes as Substitutes for Photomultiplier Tubes", n. d., 6 pages.

ROLLER CONE DRILL BIT WITH EMBEDDED GAMMA RAY DETECTOR

CROSS-REFERENCE TO RELATED APPLICATION

The present application is a U.S. National Stage Application of International Application No. PCT/US2014/071624 filed Dec. 19, 2014, which is incorporated herein by reference in its entirety for all purposes.

BACKGROUND

The present disclosure relates generally to well drilling operations and, more particularly, to downhole formation measurements.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Measurements of the subterranean formation may be made throughout the operations using downhole sensors to characterize the formation and aide in making operational decisions. Example sensors include electrodes, antennas, and gamma ray detectors. In certain drilling systems, it may be useful to determine characteristics of a portion of the subterranean formation before that portion is reached the drilling system. These determinations typically utilize "look ahead" measurements in front of the drilling system, but locating sensors to make such measurements can be difficult and expensive.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

According to aspects of the present disclosure, look ahead measurements may be provided by a gamma ray detector within a roller cone drill bit. As used herein, a gamma ray detector may comprise any sensor or mechanism that allows for a quantitative measurement of the energy spectra of a gamma-ray source. Typical sensors could be a photosensor matrix scintillating crystal such as NaI or halide crystal which interacts with the gamma ray to produce photons which are then detected by a light sensor such as a photo multiplier tube, photocell, PIN diode, photodiode or a quantum dot graphene based photon sensor, or one or more Geiger-Müller tubes typically filled with compressed $He_3$ gas that produces voltage impulses from freed electrons released by the $He_3$ atoms. Other such detectors systems exist. With the gamma ray detector located in the roller cone drill bit, the gamma-ray source may correspond to the portion of the formation in front of the drill bit, and the measured energy spectra may comprise look ahead measurements that can be processed in the wellbore, at the surface, or some combination of the two to determine a characteristic of the portion of the formation in front of the drill bit. Gamma ray detectors located further up the drill string from the drill bit do not provide the same sensitivity for look ahead measurements.

Figure 1:
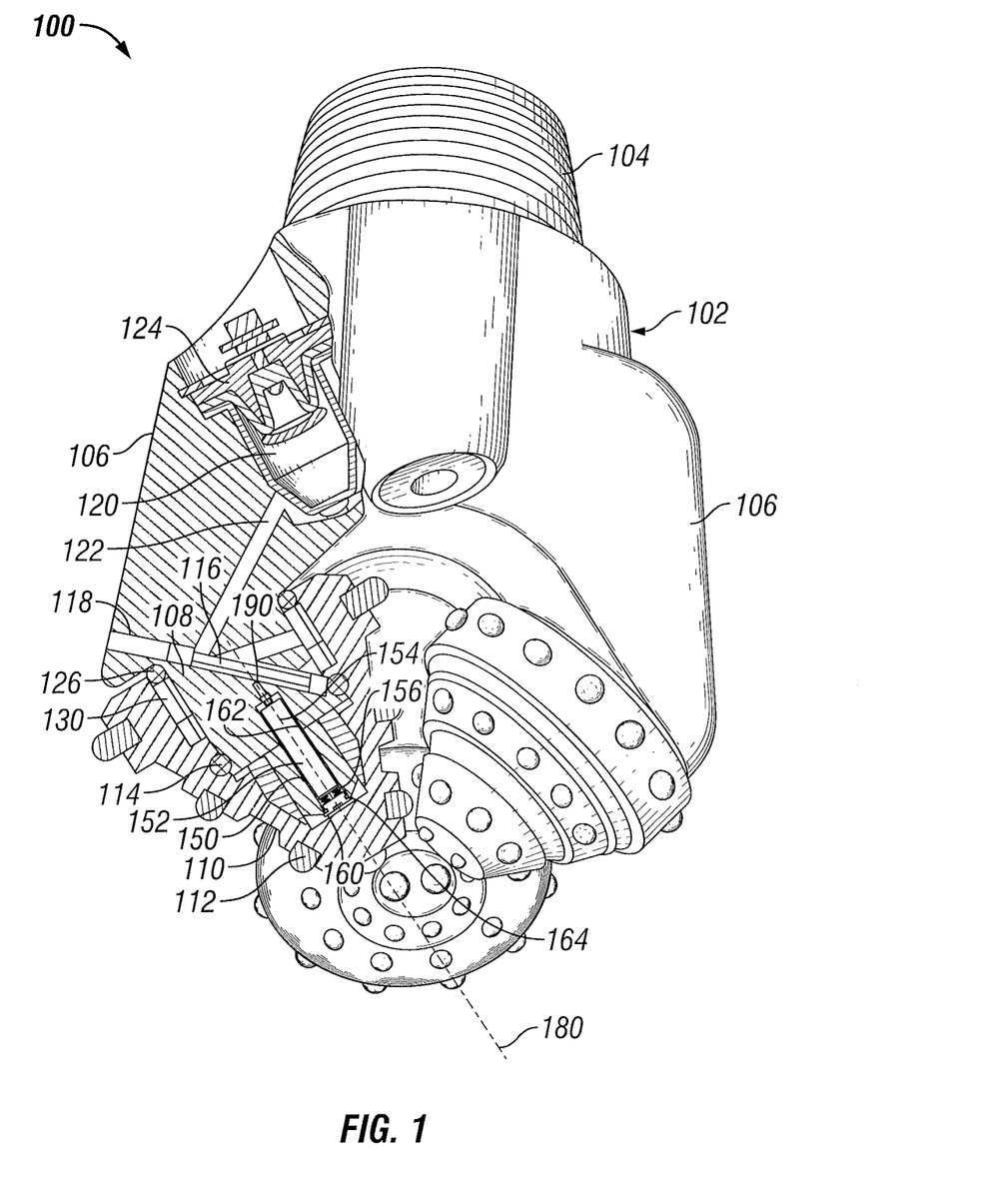
FIG. 1 is a diagram illustrating an example drill bit with a gamma ray detector, according to aspects of the present disclosure.

FIG. 1 is a diagram illustrating an example roller cone drill bit 100 comprising a gamma ray detector 150, according to aspects of the present disclosure. The bit 100 comprises a bit body 102 which has a threaded end 104, which may allow the bit 100 to be coupled to a drill string (not shown) or other downhole elements described below. The bit 100 further comprises three legs 106 extending from the bit body 102. In certain embodiments, the legs 106 may be integral with the body 102, fixedly attached to the body 102, such as by a weld, or removably attached to the body 102, such as by bolts. Although a roller cone bit 100 with three legs is shown, roller cone bits with differing numbers of legs are within the scope of this disclosure.

Each of the legs may comprise corresponding journals 108 extending therefrom. The journals 108 may extend inwardly towards a longitudinal axis of the bit body 102 and downwardly with respect to the bit body 102 itself. The journals 108 may be integrally formed with, fixedly attached to, or removably coupled to the corresponding legs 106. Additionally, each of the journals 108 may be characterized by a journal angle, which corresponds to an angle between the longitudinal axis of the bit body 100 and a corresponding longitudinal axis 180 of each of the journals 108.

A cone 110 with cutters 112 may be rotatively mounted onto each journal 108. The cone 110 may be retained on the journal 108 by ball bearings 114 which fill a race cut into the journal 108 and the inside of the cone 110. When the bit 100 is being manufactured, the ball bearings 114 may be loaded into the race through loading channel 116. This channel 116 then may be sealed by plug 118 and serve to supply lubricant to the ball bearings 114 and roller bearings 130 from the lubricant reservoir 120 through a passage 122 between the lubricant reservoir 120 and the channel 116. The bit 100 may further comprise a pressure compensator 124 that is located with the reservoir 120 to account for higher pressures and temperatures as well as lubricant loss. An elastomeric seal 126 located between the cone 110 and the journal 108 may serve to keep the lubricant in and the drilling debris out of the bearing system.

In the embodiment shown, the gamma ray detector 150 is located within the journal 108 of the bit 100. The gamma ray detector 150 may be a scintillation-type detector comprising a scintillator 152 that emits photons when contacted by gamma rays, and a receiver 154, such as a photomultiplier tube, that receives and converts the emitted photons into electrons and amplifies the resulting electrical signal provided by those electrons. The gamma ray detector 150 may be located in a cavity 156 within the journal 108 that is open at the end of the journal 108 opposite the leg 106. The cavity 156 may be machined into the journal 108 during the manufacturing process. In certain embodiments, the cavity 156 may be centered along the longitudinal axis 180 of the journal 108. In other embodiments, the cavity 156 may be upwardly offset from the center of the journal 108 to increase the amount of material in the journal 108 below the detector 150, so as to not weaken the load capacity of the bit 100. In certain embodiments, cavities and detectors with similar orientations may be used in one or more of the other legs/journals, which may increase the resolution of the look ahead measurements.

In certain instances, the detector 150 may be installed into the cavity 156 before the cone 110 is secured with respect to the journal 108. Installing the detector 150 within the cavity 156 may comprise placing the detector 150 within the cavity 156 through the opening at the end of the journal 108 opposite the leg 106, and sealing the cavity 156 by installing a retainer cap 160. In the embodiment shown, the retainer cap 160 may be removably coupled to the journal 108 proximate the opening to seal the cavity 156. In the embodiment shown, the retainer cap 160 is threadedly engaged with the journal 108 such that it can be coupled to and removed from the journal 108 as necessary. Other engagement mechanisms are possible, as would be appreciated by one of ordinary skill in the art.

The cavity 156 may comprise a pressure protective cavity that provides a pressure barrier around the detector 150. In certain embodiments, the cavity 156 may be filled with a gas at low pressure that prevents downhole pressures from being applied to the detector 150. The retainer cap 160 may seal the cavity 156 to contain the low pressure gas within the cavity 156 during use. Preventing the downhole pressure from reaching the detector 150 may increases its useful life and improve the accuracy of measurements it makes.

In certain embodiments, the bit 100 may include one or more elements proximate to or in contact with the detector 150 that protect and secure it against movement or vibrations likely to occur when the bit 100 is in use. In the embodiment shown, the detector 150 may be at least partially surrounded by a shock isolation liner 162 and secured by a compression spring 164. In the embodiment shown, the compression spring 164 is positioned between the cap 160 and the detector 150, but other configurations are possible. The compression spring 164 may comprise any known types of compression spring such as a Belleville spring, with the compressive force supplied by the installation of the cap 160. The shock isolation liner 162 may comprise an elastomeric material positioned between the detector 150 and the wall of the cavity 156 to prevent contact between the detector 150 and the wall of the cavity 156 when the drill bit 100 is in use. In certain embodiments, the liner 162 may have at least one of a ribbed outer surface and a ribbed inner surface that allows room for the liner 162 to expand in response to downhole pressures and temperatures without damaging the detector 150.

Although the detector 150 is shown in the journal 108, the detector 150 may be located in other portions of the bit 100 away from the journal 108 in other embodiments, such as the bit body 100. However, locating the detector 150 within the journal 108 decreases the distance between the detector 150 and the formation in front of the drill bit 100, which may increase the accuracy and range of gamma ray measurements by the detector 150. It also reduces the amount of shielding from the bit because it reduces the amount of bit material between the detector 150 and the formation. Additionally, locating the detector 150 within the journal 108 may provide for an orientation of the detector 150 that is almost cross axis with the bottom of the wellbore, maximizing the directional sensitivity of the detector 150 toward the front of the bit 100. In other embodiments, however, the detector 150 may be positioned in a cross axis orientation with the bottom of the wellbore without being located in the journal 108.

Notably, electronics (not shown) associated with the detector 150, such as a power supply/source and a control unit that receives, processes, and/or transmits measurements from the detector 150, are preferably not located within the journal 108. Rather, they are located outside of the journal 108, either within or outside of the bit 100, and may be communicably coupled to the detector 150 through a wire or cable 190. By locating the associated electronics outside of the journal 108, the size of the scintillator 152 in the journal 108 and therefore the resolution of the detector 150 may be increased. This leads to a more efficient use of the available space within the journal 108.

Figure 2:
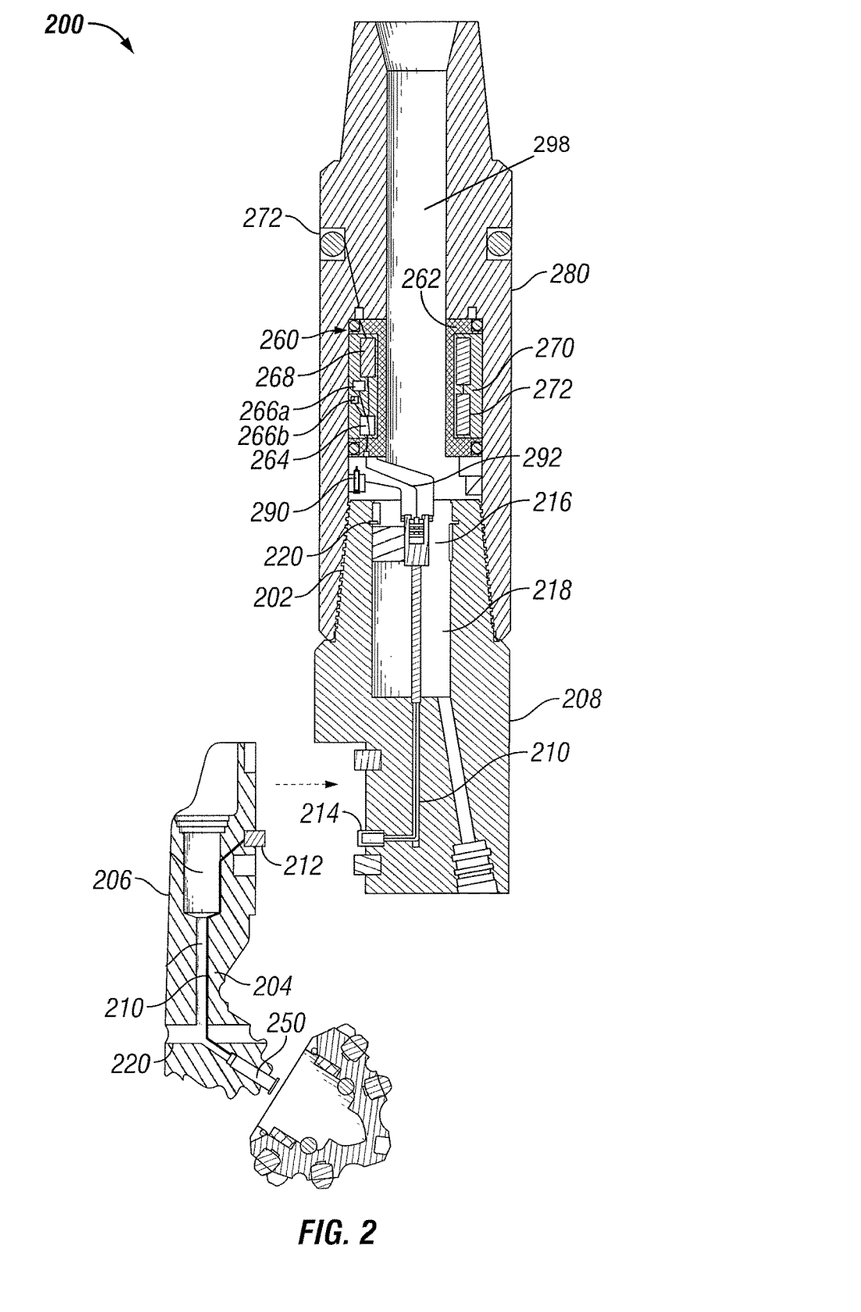
FIG. 2 is a diagram illustrating an example drill bit with an instrument sub, according to aspects of the present disclosure.

FIG. 2 is a diagram of an example roller cone drill bit 200 with a gamma ray detector 250 in which associated electronics 260 for the detector 250 are located in an instrument sub 280 coupled to a threaded end 202 of the bit 200, according to aspects of the present disclosure. Like the bit described above, the gamma ray detector 250 is located in a journal 204 extending from a leg 206 coupled to a bit body 208, and may be communicably coupled to associated electronics 260 through a wire or cable 210. In the embodiment shown, a first portion of the cable 210 couples the detector 250 to a connector 212 on the leg 206, and a second portion of the cable 210 couples a connector 214 on the bit body 208 to another connector 216. The connector 212 may be positioned to align with the connector 214 when the leg 206 is coupled to the bit body 208, and may facilitate removal of the leg 206 from the bit body 208, although the leg 206 does not have to be removable. When the leg 206 is integral with the bit body 208, the connectors 212 and 214 may be omitted, and a single, uninterrupted cable may be run from the detector 250 through the leg 206 and the bit body 208 to the connector 216.

The connector 216 may provide an interface to removably couple the detector 250/cable 210 to the associated electronics 260 in the instrument sub 280. In the embodiment shown, the connector 216 comprises a plunger-type connector 216 in which the female portion of the connector 216 is coupled to the cable 210, and also coupled to the bit 200 through a lock-ring/groove engagement 220 in an inner chamber 218 of the bit body 208. Conversely, the male portion of the connector 216 is coupled to the associated electronics 260 through a cable 292, coupled to the sub 280 through retainer ring and fastener 290, and aligned to engage with the female portion when the instrument sub 280 is coupled to the bit 200. The relative positions of the male and female portions with respect to the bit 200 and sub 280 may be switched, as can the manner in which the male and female portions are respectively coupled to the bit 200 and instrument sub 280. Likewise, other connector types and configurations are possible, including inductive couplings that are located outside of the internal chamber 218 of the bit body 208.

In the embodiment shown, the associated electronics 260 comprise a control unit 264 and power source 270 located within a sealed housing 262. The sealed housing 262 may protect the associated electronics 260 from a flow of drilling fluid through the internal bore 298 of the sub 280, as will be described in detail below. Both the control unit 264 and power source 270 may be coupled to the connector 216 through the cable 292. The power source 270 may comprise power storage elements, such as batteries, or power generation elements, such as turbines, etc., and power from the power source 270 may be provided to the detector 250 through the cable 210. In certain embodiments, the power source 270 may be coupled to the cable 292 and therefore the detector 250 though a sensor power supply 272. The control unit 264 may perform some or all of receiving measurements from the detector 250 through the cables 210 and 292; storing, processing, and/or transmitting to another control unit the received measurements; and transmitting control signals to the detector 250 through the cables 210 and 292. As used herein, a control unit may include device that contains at least one processor communicably coupled to a non-transitory computer readable memory device containing a set of instructions that when executed by the processor, cause it to perform certain actions. Example processor include microprocessors, microcontrollers, digital signal processors (DSP), application specific integrated circuits (ASIC), or any other digital or analog circuitry configured to interpret and/or execute program instructions and/or process data.

In certain embodiments, the associated electronics 260 may comprise other electrical elements, such at least one orientation sensor. Example orientation sensors include gyroscopes, X and Y axis magnetometer stacks and accelerometer stacks. Sensor "stacks" may include at least two orthogonal sensors that measure the cross axis direction of the longitudinal axis for the drill bit which is in general alignment with the hole direction. In the embodiment shown, the orientation sensor comprises a gyroscope 266a and magnetometer stack 266b, both of which are coupled to the control unit 264. The control unit 264 may receive measurements from all of the detector 250, gyroscope 266a, X and Y axis magnetometers 266b, and any other orientation sensor in the associated electronics 260 such as at least two orthogonally oriented accelerometers measuring the gravity force in the X and Y cross axis direction of the drill bit. The measurements from the orientation sensors may identify the rotational orientation of the sub 280 and drill bit 200 when the measurements were taken at the detector 250.

In certain embodiments, the control unit 264 may process the measurements received from the detector 250 by correlating those measurements with the corresponding angular orientation of the drill bit 200. The angular orientation of the drill bit 200 maps the angular rotation of the gamma ray sensors. Data received over a certain arc length interval by the gamma ray sensors can be binned into storage locations for that arc length. The binned data may then be aggregated into an azimuthal profile of the sensed gamma ray radiation, which corresponds to an azimuthal profile of the formation ahead of the drill bit due to the placement of the sensor.

In certain embodiments, the associated electronics 260 may further comprise a communications system to allow control unit 264 to transmit the received and/or processed measurements of the detector 250 to another control unit for storage or processing. In the embodiment shown, the communication system comprises a communications interface 268 coupled to the control unit 264 and a toroid 272 coupled to the interface 268 and positioned on an outer surface of the sub 280. The toroid 272 may be one of a pair of toroid that can be used to establish a short-hop telemetry system using modulated electromagnetic (EM) signals for bi-directional data transmission, with the other toroid being located away from the toroid 272 by a short distance, such as 30 feet. Although a short-hop EM telemetry system is shown, other types of communications systems are possible, including wired communications systems in which a connector is integrated into the sub 280 and magnetic induction coupling between two points such as using an time varying electromagnet like a solenoid, rather than electrical current induction coupling which is performed by the toroid.

Figure 3:
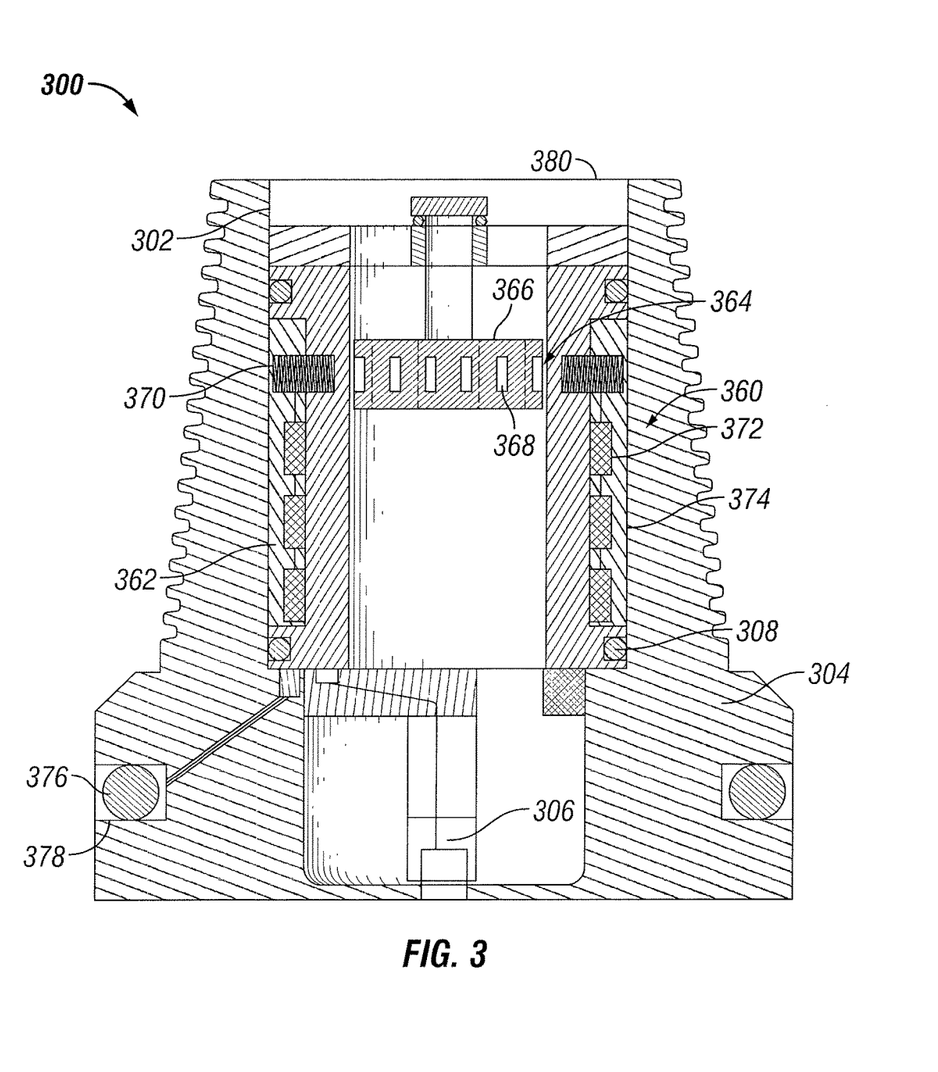
FIG. 3 is a diagram illustrating another example drill bit, according to aspects of the present disclosure.

In addition to locating the associated electronics outside of the bit containing the gamma ray detector, such as in the sub 280, certain embodiments include some or all of the associated electronics within the bit. One example of such an embodiment is shown in FIG. 3, in which the associated electronics 360 are at least partially located in a bit body 304 of a drill bit 300. In particular, the associated electronics 360 are at least partially located in a sealed housing 308 within an internal chamber 302 of the bit body 304. Like the bore of the instrument sub described above, the internal chamber 302 may serve as a flow pathway for drilling fluids through the bit 300, and the sealed housing 308 may protect the associated electronics 360 from the flow of drilling fluids. Locating the associated electronics 360 within the internal chamber 302 may allow for easy installation of the electronics during the manufacturing process, but such a location is not required, and the associated electronics may be located in other portions of the bit body 304 and the bit 300 generally.

In the embodiment shown, the associated electronics 360 comprise at least a control unit 362 and a power source 364, both of which may be coupled to the gamma ray detector (not shown) through a cable 306. Here, the power source 364 is a power generator comprising a turbine 366 with permanent magnets 368 of alternating polarity affixed to its outer surface and positioned within corresponding coils 370. A flow of drilling fluid through the internal chamber 302 may cause the turbine 366 to rotate and current to be generated within the coils 370 due to the alternating polarity of the permanent magnets 368. In certain instances, the power source 364 may comprise power storage elements 372, such as rechargeable batteries or capacitors including super or large capacity capacitors, coupled to the coils 370 in order to store energy generated by the coils 370 and provide the stored energy to the gamma ray detector when the turbine 364 is not rotating. In certain embodiments, the associated electronics 360 may further comprise a sensor power supply 374 coupled to the power source 364, through which power from the power source 364, either directly from the coils 370 or indirectly from the coils 370 through the power storage elements 372, is supplied to the gamma ray detector. In some instances, such as when a photomultiplier tube is used for photon detection from the scintillator, the sensor power supply 374 may comprise a high voltage power supply typically in the range of 800-1500 Volts is required; however, if a semiconductor based photon sensor is utilized, such as a photodiode, the sensor power supply 374 may comprise much lower voltage power supply in or about the range of 0.1-50.0 volts. In general though the sensor power supply 374 will be matched to the needs of the particular photon sensor selected. Other types, combinations, and configurations of power generators and storage elements may used within the scope of this disclosure, including vane turbines coupled to a center shaft generator. Additionally, the power generator shown in FIG. 3 as well as similar power generators may be adapted for use in the sub 280 described above.

In the embodiment shown, the associated electronics 360 further comprises a short-hop telemetry communications system similar to the one described above. In this embodiments, however, a toroid 376 of the communications system is located in a channel 378 machined into an outer surface of the bit body 304. The location of the toroid 376 on the bit body 304 may be changed depending on the configuration of the bit body 304, and in particular the orientation of the legs (not shown) with respect to the bit body 304. A connector also may be located in a machined portion of the bit body, such as at the top 380 of the bit body 304, in the case a wired communications system may is used.

Figure 4:
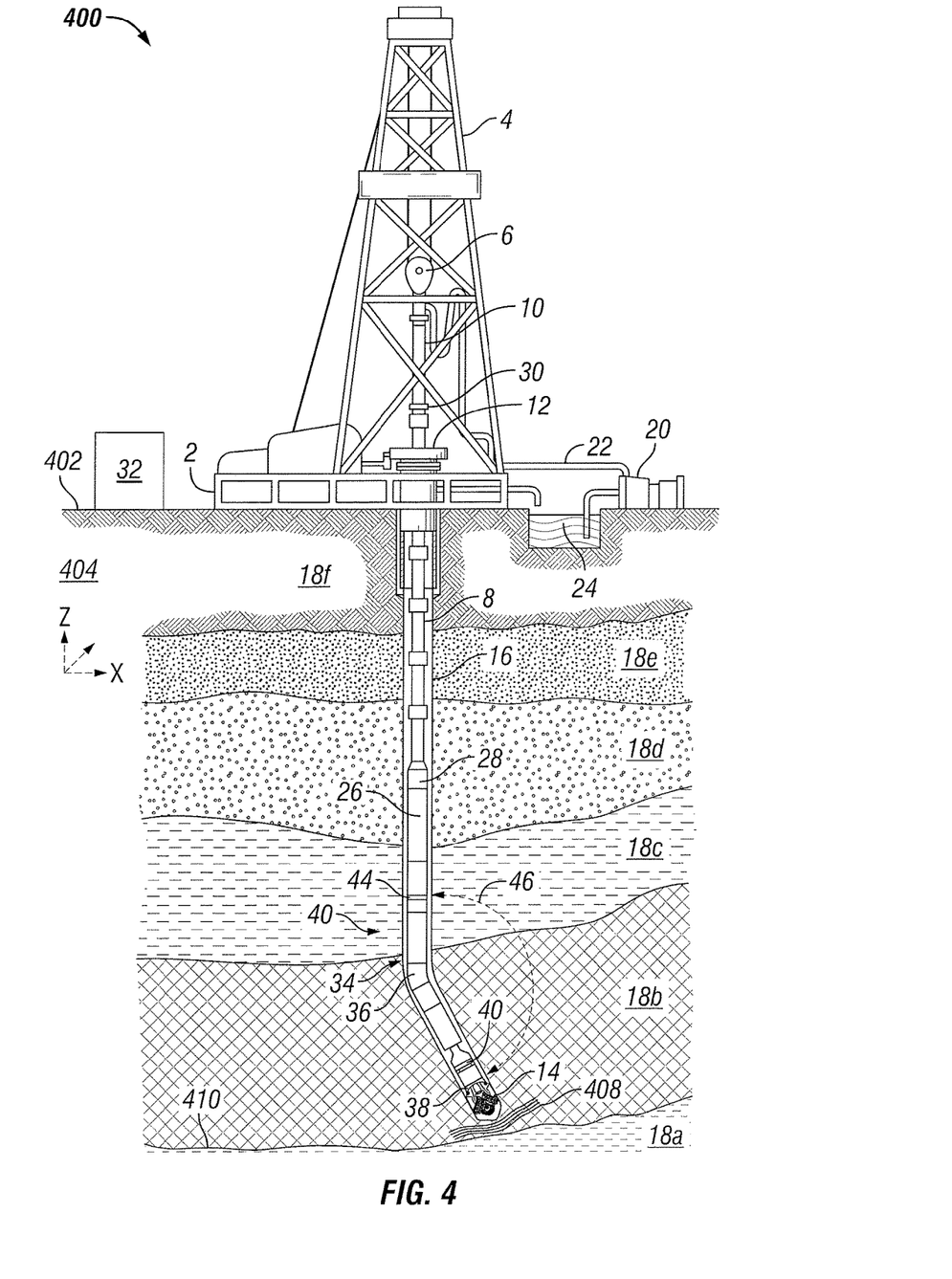
FIG. 4 is a diagram illustrating an example drilling system, according to aspects of the present disclosure.

FIG. 4 is a diagram of an example drilling system 400 incorporating a roller cone drill bit 14 with a gamma ray detector (not shown), according to aspects of the present disclosure. The drilling system 400 comprises a drilling platform 2 positioned at the surface 402. In the embodiment shown, the surface 402 comprises the top of a formation 404 containing one or more rock strata or layers 18a-f, and the drilling platform 2 may be in contact with the surface 402. In other embodiments, such as in an off-shore drilling operation, the surface 402 may be separated from the drilling platform 2 by a volume of water. A derrick 4 may be supported by the drilling platform 2 and have a traveling block 6 for raising and lowering a drill string 8 with a borehole 16 created by the drill bit 14. A kelly 10 may support the drill string 8 as it is lowered through a rotary table 12.

The drill bit 14 may be coupled to the drill string 8 and driven by a downhole motor and/or rotation of the drill string 8 by the rotary table 12. In the embodiment shown, the drill bit 14 is coupled to the drill string 8 through an instrument sub 38 containing associated electronics for the gamma ray detector in the drill bit 14. This includes a toroid 40 of a short-hop EM telemetry system similar to those described above. In other embodiments, a drill bit 14 in which the associated electronics are located in the bit 14 may be used. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 400 may further comprise a bottom hole assembly (BHA) 406 coupled to the drill string 8 near the drill bit 14. The BHA 406 may comprise various downhole measurement tools and sensors, such as LWD/MWD tool 26, as well as a telemetry system 28 used to communicate between down hole and the surface, and a steering system 34 such as a downhole motor or a rotary steerable tool. A corresponding toroid 44 to the toroid 42 in the instrument sub 38 may be located within and coupled to a control unit of the BHA 406, and may establish an EM telemetry channel 46 between the BHA 406 and the instrument sub 38. In the embodiment shown, the toroid 44 is coupled to the LWD/MWD tool 26, although such a configuration is not required.

The LWD/MWD tool 26 may comprise different types of sensors that may collect measurements of the formation 406 surrounding the tool 26 and the BHA 406 generally. In certain embodiments, the LWD/MWD tool 26 may include a control unit (not shown) coupled to the sensors that receives and stores measurements from the sensors, processes the measurements, and/or transmits those measurements to a different control unit in the drilling system. In the embodiment shown, the toroid 44 may be coupled to the control unit within the LWD/MWD tool 26, and the control unit may treat toroid 44 as another sensor in the LWD/MWD tool 26 and the signal received through the toroid 44 as a corresponding measurement of the toroid 44. Because the signal received through the toroid 44 corresponds to the electrical signal generated by the gamma ray detector, the control unit of the LWD/MWD tool 26 may effectively treat the gamma ray detector as a sensor of the LWD/MWD tool 26, even through the detector is located in the drill bit 14.

The steering system 34 may comprise a downhole mud motor that generates torque in response to the flow of drilling fluid through the drill string 8 and applies that torque to the drill bit 14. In the embodiment shown, the steering system 34 further comprises a bent housing 36 that causes the drill bit 14 to drill at an angle with respect to the drill string 8. In certain embodiments, the bent housing 36 may be adjustable such that the drilling angle may be altered downhole, allowing the drill bit 14 to be "steered" during the drilling process. In certain embodiments there may be an orientation device above the bent housing either integrated into the motor or at some point above the motor that orients the tool face in a desired direction. In other embodiments, separate steering tools or devices may be used in addition to or instead of the steering system 34 and bent housing 36 to steer the drill bit in a selected drilling direction. For example, when torque at the drill bit 14 is generated by the rotary table 12 through the drill string 8, rather than through a motor, one or more of a point-the-bit and push-the-bit type rotary steerable systems may be used to alter the angle of the drill bit 14. The drill bit 14 may be steered to intersect one of the formation strata 18*a-c* that contains hydrocarbons, avoid certain undesired strata or formation bodies, follow an existing borehole, or intersect an existing borehole to drill relief wells in the case of a blowout.

The tools and sensors of the BHA 406 may be communicably coupled to the telemetry element 28. The telemetry element 28 may itself include a control unit (not shown) and may transfer measurements and signals from the BHA 406 to a surface receiver 30 and/or to receive commands from the surface receiver 30. The telemetry element 28 may comprise a mud pulse telemetry system, an acoustic telemetry system, a wired communications system, a wireless communications system, or any other type of communications system that would be appreciated by one of ordinary skill in the art in view of this disclosure. In certain embodiments, some or all of the measurements taken at the BHA 406 may also be stored for later retrieval at the surface 402.

In certain embodiments, the drilling system 400 may comprise surface control unit 32 positioned at the surface 402. In certain embodiments, the surface control unit 32 may provide additional functionality not available at the control units within the borehole 16, such as a keyboard and monitor that allow a user at the surface to interact with the surface control unit 32. The surface control unit 32 may be communicably coupled to the surface receiver 30 and may receive measurements and signals from BHA 406 and/or transmit commands to the BHA 406 though the surface receiver 30. Due to the lack of size constraints at the surface 402, the surface control unit 32 typically has greater processing capability that the control units located downhole.

When the drilling system 400 is in use, the drill bit 14 may rotate and extend the borehole 16 through a portion 408 of the formation 404 in front of the drill bit 14. The gamma ray detector(s) within the drill bit 14 may detect gamma rays emitted by the portion 408 of the formation 404 in front of the drill bit 14, and generate a corresponding electrical signal, as described above. This corresponding electrical signal may comprise look ahead measurements which may be processed by one or more control units within the drilling system to determine at least one characteristic of the portion 408 of the formation 404. Example characteristics include the geometry of the portion 408, the composition of the portion 408, and the location and orientation of a boundary between two rock strata within the portion 408. In certain embodiments, once determined, the characteristic may be used to make a decision with respect to the operation of the drilling system 400. For example, if the characteristic of the portion 408 comprises the location of the boundary 410 between the strata 18*a* and 18*b*, the decision may include altering a drilling angle or tool face orientation of the drill bit 14 at the steering system 34, or stopping the drilling process before the boundary 410 is crossed.

Figure 5:
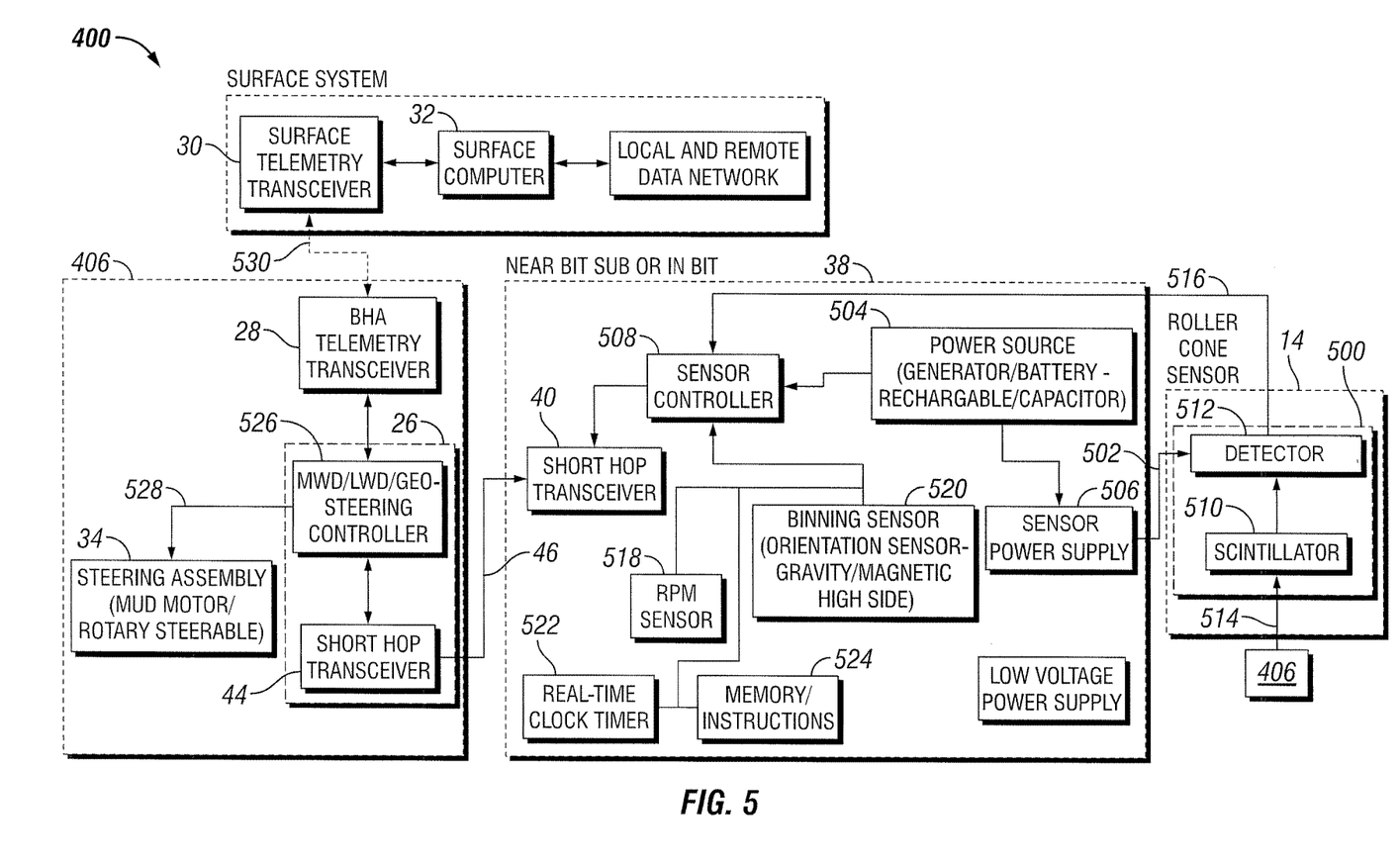
FIG. 5 is a block diagram of an example drilling system, according to aspects of the present disclosure.

FIG. 5 is a block diagram of the drilling system 400, according to aspects of the present disclosure, and illustrates the control units and electrical elements of the drilling system 400 that may be used to generate, transmit, store, and/or process the look ahead measurements from the drill bit 14, as well as the communications channels and signals that may be present between the electrical elements to facilitate the generation, transmission, storage, and/or processing of the look ahead measurements. As can be seen, drill bit 14 includes a gamma ray detector 500 which may be coupled to associated electronics within the instrument sub 38. In particular, the gamma ray detector 500 may receive power 502 from a power source 504 through a sensor power supply 506. A scintillator 510 of the gamma ray detector may receive gamma radiation 514 from the portion 406 of the formation in front of the drill bit 14, which may in turn cause the photomultiplier 512 to generate an electrical signal 516, as described above. This electrical signal 516 may comprise a look ahead measurement from the drill bit 14, and may be communicated from the detector 500 to the control unit 508.

Once received at the control unit 508, the look ahead measurements 516 may be at least one of stored, processed, and transmitted by the control unit 508, which may be powered directly or indirectly by the power source 504. In the embodiment shown, the control unit 508 is coupled to orientation sensors 518/520, a clock/timer 522, and a memory device 524. In certain embodiments, the control unit 508 may process the look ahead measurements 516 with measurements from the orientation sensors 518/520 as well as a time signature from clock/timer 522 to correlate the look ahead measurements with a rotational orientation of the drill bit 14. The processed look ahead measurements and/or raw look ahead measurements 16 may be stored within the memory device 524 for later retrieval. In certain embodiments, the memory device 524 may comprise any non-transitory computer readable medium and in addition to storing the measurements, may contain a set of instructions that when executed by a processor of the control unit 528 cause the process to perform certain actions.

In certain embodiments, the control unit 508 further may transmit either the processed look ahead measurements or the raw look ahead measurement 516 to another control unit with the drilling system 400, such as a control unit within the BHA 406 or the surface control unit 32 for processing, storage, and/or transmission. In the embodiment shown the control unit 508 is coupled to the toroid 40 of the instrument sub 38, and the control unit 508 may transmit either the processed look ahead measurements or the raw look ahead measurement 516 over the bi-directional short-hop EM telemetry channel 46 between the toroid 40 and the toroid 44 of the BHA 406. This transmission may be directed to a control unit within the BHA 406, as will be described below, or may be directed to the surface control unit 32 using the BHA 406 as an intermediary device. Other embodiments may include other communication channels, mechanisms, and configurations, including wired communications between the control unit 508 and BHA 406 and a direct communications pathway between the control unit 508 and surface control unit 32.

The toroid 44 of the BHA 406 may be coupled to a control unit 526 within the BHA 406. In the embodiment shown, both the toroid 46 and control unit 526 are coupled to the LWD/MWD tool 26 of the BHA 406, but the toroid 46 and control unit 526 may be located together or separately in other tools or portions of the BHA 406. Once the control unit 526 has received the look ahead measurements from the toroid 44, the control unit 526 may store the received measurements, further process and then store the received measurements to determine a characteristic of the portion 406 of the formation 404, and/or transmit the received or processed measurements to the surface control unit 32. In certain embodiments, the control unit 526 may determine the characteristic of the portion 406 of the formation 404 from the received measurements and then automatically make a drilling decision based on the determined characteristic and a decision algorithm stored as instructions in a memory device coupled to a processor of the control unit 526. For example, if the determined characteristic is the location of a strata boundary within the portion 406 of the formation 404, the control unit 526 may output a control signal 528 to the steering system 34 that causes the motor to alter the angle or toolface direction of the drill bit 14. Alternately if a rotary steerable tool is utilized, the steering direction of the rotary steerable tool may be altered. A manual or automated system may be employed for adjusting the steering of the hole being drilled based on data received from the gamma ray sensor in the drill bit.

In certain embodiments, the control unit 526 may transmit the measurements to the surface control unit 32 using the telemetry system 28 within the BHA 406. In particular, the control unit 526 may transmit the measurements to the telemetry system 28, which may communicate the measurements over a bi-directional telemetry channel 530 between the telemetry system 28 and the surface receiver 30. The surface control unit 32 may receive the measurements from the surface receiver 30. In other embodiments, the surface control unit 32 may receive the measurements from one of the control units 526 and 508 after those control units are removed to the surface. The surface control unit 32 may process the received measurements to determine one or more characteristics of the formation corresponding to the received measurements. In certain embodiments, the determined characteristics may be used in a drilling control program run at the surface control unit 32 to make a drilling decision, similar to the one described above with respect to control unit 526, and generate a control signal corresponding to the drilling decision. If the decision is made while the control unit 526 and 508 are located downhole, the generated control signal may be transmitted through the telemetry channel 530 to the BHA 406.

As described above, the associated electronics for the in-bit gamma ray detectors may be located outside of the drill bit, such as in an instrument sub, or in the drill bit. Locating the associated electronics outside of the drill bit may reduce the cost of the drill bit and allow for the associated electronics to be reused by a new bit after the an initial drill bit wears out during the drilling process. This is particularly beneficial because typical drilling operations wear out many drill bits. When the associated electronics are located outside of the drill bit, however, the new drill bit may need to be calibrated to the associated electronics to optimize the measurements taken by the in bit gamma ray detector. One particular area in which calibration may be necessary is the power level supplied to the gamma ray detector by a power source in the associated electronics. In particular, the geometries and configurations of the gamma ray detector(s) with the different drill bits may be slightly different, meaning that a different power level to power the detector.

Figure 6A:
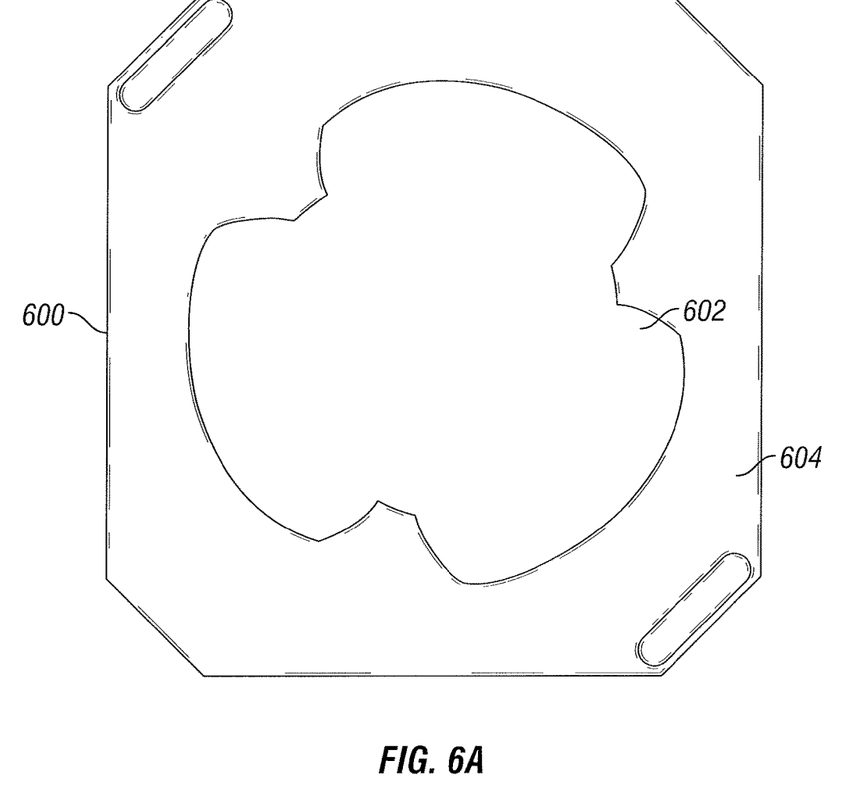
FIG. 6 is a diagram of an example bit breaker basket, according to aspects of the present disclosure.
Figure 6B:
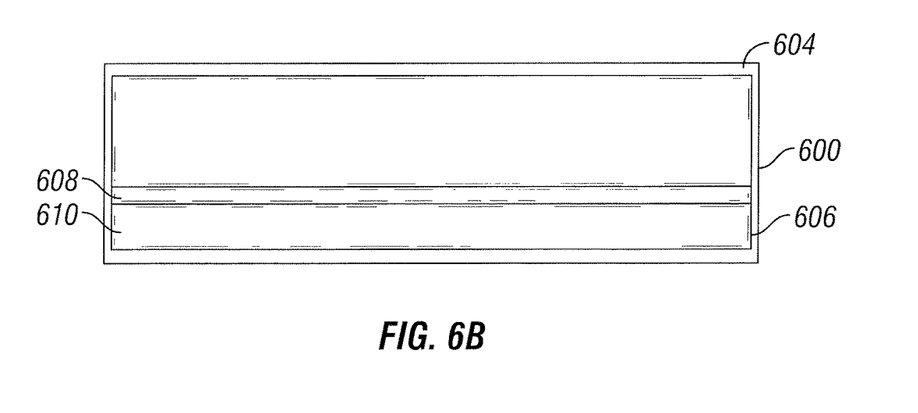

According to aspects of the present disclosure, the new bit may be calibrated with respect to the associated electronics using a bit breaker basket containing a material with a known gamma energy spectrum. FIG. 6 is a diagram of an example bit breaker basket 600, according to aspects of the present disclosure. When a bit wears out, the entire drill string may be removed from the borehole, after which the old bit is removed and the new bit is replaced. The new bit may be placed in an opening 602 in the top surface 604 of the bit breaker basket 600, and the opening 602 may secure the new bit while it is being connected to the drill string. Likewise if the bit is merely worn somewhat but still useful for another run in the hole, the bit breaker basket may be used to verify the sensor function and or calibration prior to re-running the semi-worn drill bit. Likewise the sensor calibration can be adjusted prior to being re-run in the hole to correct for wear on the drill bit or any other alterations such as broken cutters or bit nozzle size changes or replacement components added to the outside or inside of the drill bit such as gage pads, new electronics carriers, generators etc.

In the embodiment shown, the bit breaker basket 600 comprises a bottom chamber 606 separated from the top surface 604 by a divider 608. A material 610 with a known gamma energy spectrum may be located within the chamber 606. One example material 310 is sand containing thorium. While it is not necessary to integrate the gamma material into a bit breaker, the combination may save time since the device is used for making and breaking drill bits off of the BHA. This allows the gamma sensor to be evaluated both when it comes out of the hole and is about to being broken off to see if it is functioning properly after the bit run and just before the bit run as it is being made up to the BHA.

According to aspects of the present disclosure, thorium-229, potassium-40, or other gamma ray emitting isotopes which are typically in a shale compound within the chamber 606 may emit gamma radiation that can be detected by a gamma ray detector within the drill bit. Before, during, or after the drill bit has been coupled to the instrument sub, and with the bit still located within the bit breaker basket 600, the associated electronics within the instrument sub may be signaled to perform a self-calibration operation controlled, for example, by a control unit within the instrument sub. In certain embodiments, the self calibration operation may comprise outputting voltage levels across a range of voltage level from a power source within the instrument sub. At each voltage level output, the control unit may receive an electrical signal from the gamma ray detector that corresponds to the number of "counts" or gamma rays received in a second. The control unit then may determine an optimal operating voltage for the power source based, at least in part, on the number of counts, and set the power source to output power at that voltage level or scale the received counts to the known emission level of the bit breaker basket 600.

Figure 7:
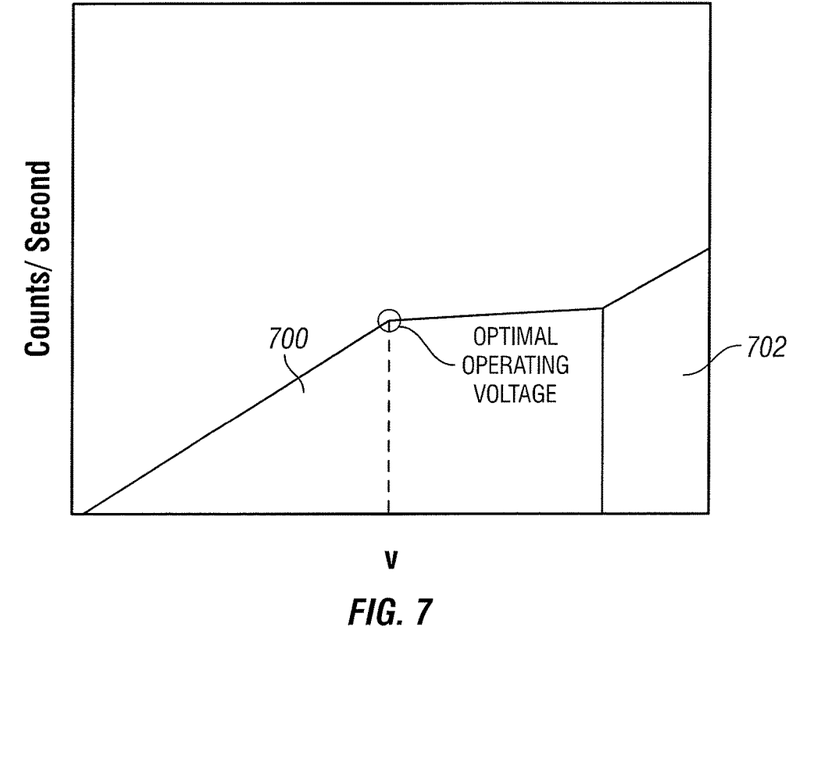
FIG. 7 is a chart for an example calibration process, according to aspects of the present disclosure.

In certain embodiments, the optimal operating voltage may correspond to a range of voltages over which the number of counts does not vary significantly. FIG. 7 illustrates an example chart in which the output voltage level is plotted against the number of counts per second received from the detector. As can be seen, within the range beginning at voltage level 700 and ending at voltage level 702, the counts per second received from the detector essentially plateaus. The optimal operating voltage can be selected from one of the voltages with that range, but ideally at the voltage level 700, the voltage level at which the counts per second begins to plateau, so as to most efficiently use the available power. In certain embodiments, the optimal voltage may be determined by increasing the output voltages from the power source until the plateau is identified, and then lowering the output voltage until the beginning of the plateau is determined. In certain embodiments, the self-calibration operation may be completed again once the bit is removed from the bit breaker basket, thereby discerning the effects of background radiation and noise and improving the determination of the optimal voltage level.

Although the gamma ray detectors described in the embodiments above include scintillators and photomultipliers, other detector types and configurations are possible. For example, instead of photomultipliers, solid state photodiodes or phototransistors may be used to detect the photons generated by the scintillation device. The solid state photodiodes or phototransistors may have a smaller profile than typical photomultipliers, which may be beneficial when locating the detector within the journal of a roller cone bit.

Figure 8A:
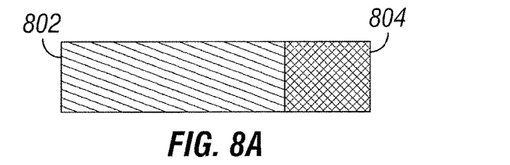
FIG. 8 is a diagram illustrating two example gamma ray detectors, according to aspects of the present disclosure.
Figure 8B:
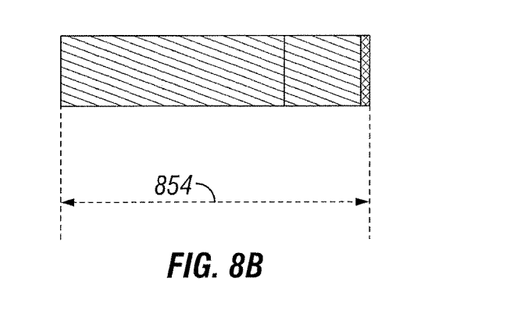
Figure 8C:
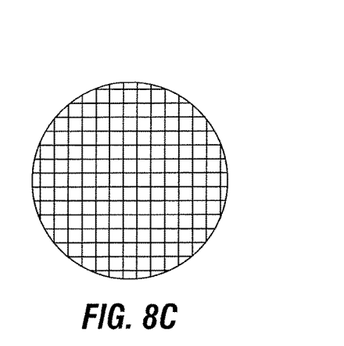

FIG. 8 is a diagram illustrating two example gamma ray detectors 800 and 850 for use in a roller cone bit, according to aspects of the present disclosure. Gamma ray detector 800 comprises a scintillator 802 aligned with photomultiplier 804, with the detector 800 having a combined length 880. Gamma ray detector 850 comprises a scintillator 852 aligned with a photodiode 854, with the detector 850 also having a combined length 880. Notably, however, the photodiode 854 is shorter than the photomultiplier 804, meaning that the scintillator 852 is longer than the scintillator 802. Because the sensitivity of a gamma ray detector depends, in part, on the size of the scintillator, the gamma ray detector 850 with the photodiode 854 may be more sensitive that the similarly sized detector 800 with the photomultiplier 804. When used in a drill bit, detector 850 may provide for higher resolution look ahead measurements. Moreover, because the photodiode 854 is smaller than the photomultiplier 804, the photodiode 854 may be used with a scintillator similar in size to the scintillator 802 to produce a detector with similar performance to the detector 800 but with a smaller length. This may be useful where the space to locate the gamma ray sensor is limited, such as within the journal of a roller cone drill bit.

Figure 9A:
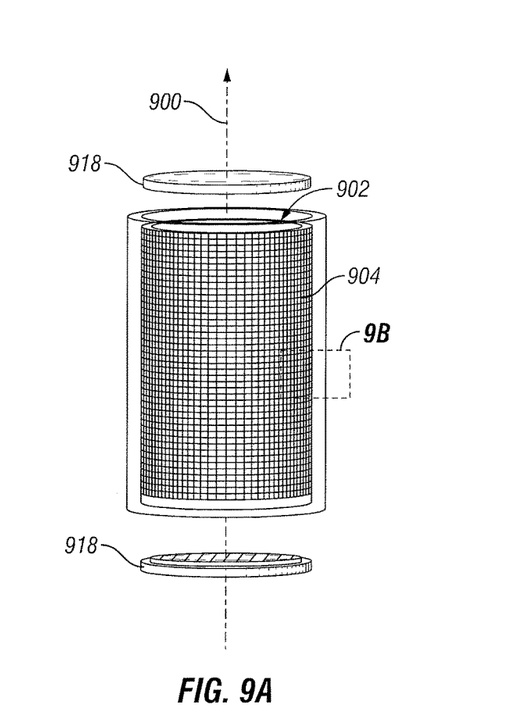
FIG. 9 is a diagram illustrating another example gamma ray detector, according to aspects of the present disclosure.
Figure 9B:
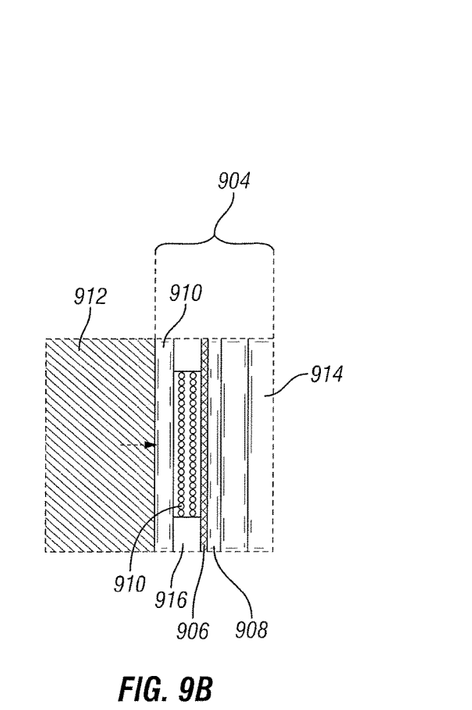

In other embodiments, the gamma ray detectors described herein may comprise photo sensors or detectors that are wrapped around rather than aligned with the scintillator. One example detector 900 is shown in FIG. 9. The detector 900 may comprise a cylindrical, oval, square or rectangular scintillator 902 around which is wrapped a multilayer photodetector 904 comprising a photosensor matrix. In the embodiment shown, the photosensor matrix may comprise a graphene layer 906 that is deposited on a silicon dioxide layer 908. In certain embodiments, quantum dots 910 may be located between the graphene layer 906 and the scintillator 902 to facilitate the reception of photons 912 by the graphene layer 906 after those photons 912 are generated by the scintillator 902 is response to one or more gamma rays 914

In the embodiment shown, one or more electrodes 916 may be positioned proximate to the graphene layer 906 and near the quantum dots 910 to sense electrical fluctuations in the graphene layer 906 caused by the photons 912. These electrodes 916 may be electrically coupled to a one or more signal collectors 918 which may be electrically coupled to a power source and include amplification circuits to amplify the electrical signals received from the electrodes 916. Notably, the power required to generate electrical signals may be orders of magnitude less than that required for typical detectors based on the conductive capacity of the graphene. In certain embodiments, a silicon layer 950 and protective jack 952 may be located outside of the silicon dioxide layer 908. Similar or different photon detectors may also be positioned on either or both ends of the scintillator.

In addition to the detector shown in FIG. 9, other types of detectors using graphene may be used within the scope of this disclosure. For example, in certain instances, rather than depositing graphene on a solid surface such as silicon dioxide, the graphene layer may be deposited on a flexible surface and wrapped around a scintillator in multiple layers, increasing the photon detection capability of the detector, as each layer of graphene increases the percentage of photons detected. Similarly, an in line photodetector, similar to the photodiode described in FIG. 8, with multiple layers of graphene may be used to increase the photon detection capability and therefore performance of the corresponding gamma ray detector. Generally, detectors using graphene may be beneficial when placing a sensor within the drill bit because the graphene sensor can be made very small yet highly sensitive compared to photodiodes or photomultipliers and with a low operating voltage requirement thereby allowing for a smaller scintillator with higher sensitivity.

According to aspects of the present disclosure, an example apparatus includes a drill bit body and a leg extending from the drill bit body. A journal may extend from the leg, with a gamma ray detector at least partially within the journal. In certain embodiments, the gamma ray detector may be confined within a pressure protective cavity at least partially within the arm of the journal. In certain embodiments, the gamma ray detector may be a scintillator aligned with at least one of a photomultiplier, photodiodes, or phototransistors.

In any of the embodiments described in the preceding paragraph, the apparatus may further include a cavity at least partially within the journal, with an opening at an end of the journal opposite the leg, that at least partially contains the gamma ray detector; and a retainer cap removably coupled to the journal proximate the opening. In certain embodiments, the apparatus may further include an elastomeric liner at least partially surrounding the gamma ray detector within the cavity; and a compression spring between the gamma ray detector and the retainer cap.

In any of the embodiments described in the preceding two paragraphs, the apparatus may further include a control unit and a power source communicably coupled to the gamma ray detector. In certain embodiments, at least one of the control unit and the power source are located in at least one of the drill bit body and an instrument sub coupled to the drill bit body. In certain embodiments, the power source comprises at least one of a power storage element and a power generation element. In certain embodiments, the power generation element comprises a fluid driven turbine.

In certain embodiments, the apparatus may further include a communication system coupled to the control unit. The communication system may include at least one of a toroid and a wire connector coupled to one of the drill bit body and the instrument sub. In certain embodiments, at least one of the control unit and the power source is within a sealed housing. In certain embodiments, the control unit comprises a processor and a memory device coupled to the processor, the memory device containing a set of instructions that, when executed by the processor, cause it to receive at least one electrical signal from the gamma ray detector; and at least one of process the received electrical signal; store the received electrical signal or processed electrical signal; and transmit the received electrical signal or processed electrical signal to another control unit.

In certain embodiments, the apparatus may further include at least one orientation sensor coupled to the control unit. The set of instructions that cause the processor to process the received electrical signal may further cause the processor to receive measurements from at least one of the gyroscope and the magnetometer; and correlate the received electrical signal from the gamma ray detector with the received measurements from at least one of the gyroscope and the magnetometer.

In certain embodiments, the gamma ray detector may comprise a scintillator around which is wrapped a photosensor matrix with a graphene layer. The photosensor matrix with the graphene layer may comprise a flexible surface that is at least one of wrapped around a scintillator more than once and positioned on either or both ends of the photosensor matrix.

According to aspects of the present disclosure, an example method includes positioning at the end of a borehole in a subterranean formation a gamma ray detector in a journal of a roller cone drill bit and receiving from the gamma ray detector an electrical signal corresponding to a portion of the subterranean formation proximate the end of the borehole. A characteristic of the portion of the subterranean formation may be determined based, at least in part, on the received electrical signal. In certain embodiments, positioning at the end of the borehole in the subterranean formation the gamma ray detector comprises positioning at the end of the borehole in the subterranean formation a scintillator aligned with at least one of a photomultiplier, photodiodes, or phototransistors. In certain embodiments. the characteristic comprises at least one of a composition or geometry of the portion of the subterranean formation.

In any of the embodiments described in the preceding paragraph, receiving from the gamma ray detector the electrical signal further may comprise receiving the electrical signal at a control unit communicably coupled to the gamma ray detector and positioned at least one of in the roller cone drill bit, within the borehole above the drill bit, and at the surface of the subterranean formation. In certain embodiments, receiving from the gamma ray detector the electrical signal further comprises transmitting the electrical signal from the control unit to an other control unit communicably coupled to the gamma ray detector. In certain embodiments, transmitting the electrical signal from the control unit to the other control unit communicably coupled to the gamma ray detector comprises transmitting the electrical signal over a short-hop telemetry system within the borehole.

In certain embodiments, the method may further include generating at least one control signal corresponding to an operating decision made based, at least in part, on the determined characteristic. In certain embodiments, the method may further include transmitting the control signal to a steering system coupled to the drill bit. In certain embodiments, the method may further include removing the roller cone drill bit to a surface of the subterranean formation; replacing the roller cone drill bit with an other roller cone drill bit having an other gamma ray detector; and calibrating the other gamma ray detector with a power source removably coupled to the gamma ray detector.

In certain embodiments, calibrating the other gamma ray detector comprises outputting a range of output voltage levels from the power source; receiving measurements from the other gamma ray detector corresponding to the range of voltage levels and a material with a known energy spectra positioned proximate the end of the other roller cone bit; and selecting an output voltage level from the range of output voltage levels based, at least in part, on the received measurements. The material with the known energy spectra may be located in a bit breaker basket in which the other roller cone bit is at least partially positioned. The material may contain a gamma ray emitting isotope.

In certain embodiments, positioning at the end of the borehole in the subterranean formation the gamma ray detector comprises positioning at the end of the borehole in the subterranean formation a scintillator around which is wrapped a photosensor matrix with a graphene layer. The photosensor matrix with the graphene layer may comprise a flexible surface that is wrapped around a scintillator more than once.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. An apparatus, comprising:
a drill bit body;
a leg extending from the drill bit body;
a journal extending from the leg; and
a gamma ray detector at least partially within the journal;
a cavity at least partially within the journal, with an opening at an end of the journal opposite the leg, that at least partially contains the gamma ray detector; and
a retainer cap removably coupled to the journal proximate the opening.

2. The apparatus of claim 1 wherein the gamma ray detector is confined within a pressure protective cavity at least partially within an arm of the journal.

3. The apparatus of claim 1, wherein the gamma ray detector comprises a scintillator aligned with at least one of a photomultiplier, photodiodes, or phototransistors.

4. The apparatus of claim 1, further comprising
an elastomeric liner at least partially surrounding the gamma ray detector within the cavity; and
a compression spring between the gamma ray detector and the retainer cap.

5. The apparatus of claim 1, further comprising a control unit and a power source communicably coupled to the gamma ray detector.

6. The apparatus of claim 5, wherein at least one of the control unit and the power source are located in at least one of the drill bit body and an instrument sub coupled to the drill bit body.

7. The apparatus of claim 6, wherein the power source comprises at least one of a power storage element and a power generation element.

8. The apparatus of claim 7, wherein the power generation element comprises a fluid driven turbine.

9. The apparatus of claim 6, further comprising a communication system coupled to the control unit.

10. The apparatus of claim 9, wherein the communication system comprises at least one of a toroid and a wire connector coupled to one of the drill bit body and the instrument sub.

11. The apparatus of claim 6, wherein at least one of the control unit and the power source is within a sealed housing.

12. The apparatus of claim 6, wherein the control unit comprises a processor and a memory device coupled to the processor, the memory device containing a set of instructions that, when executed by the processor, cause it to:
receive at least one electrical signal from the gamma ray detector; and
at least one of
process the received electrical signal;
store the received electrical signal or processed electrical signal; and
transmit the received electrical signal or processed electrical signal to another control unit.

13. The apparatus of claim 12, further comprising at least one orientation sensor coupled to the control unit.

14. The apparatus of claim 13, wherein the set of instructions that cause the processor to process the received electrical signal further cause the processor to
receive measurements from at least one of a gyroscope and a magnetometer; and
correlate the received electrical signal from the gamma ray detector with the received measurements from at least one of the gyroscope and the magnetometer.

15. The apparatus of claim 1, wherein the gamma ray detector comprises a scintillator around which is wrapped a photosensor matrix with a graphene layer.

16. The apparatus of claim 15, wherein the photosensor matrix with the graphene layer comprises a flexible surface that is at least one of wrapped around a scintillator more than once and positioned on either or both ends of the photosensor matrix.

17. The apparatus of claim 1, wherein the gamma ray detector comprises one or more layers of graphene.

18. A method comprising,
positioning at the end of a borehole in a subterranean formation a gamma ray detector in a journal of a roller cone drill bit;
receiving from the gamma ray detector an electrical signal corresponding to a portion of the subterranean formation proximate the end of the borehole;
determining a characteristic of the portion of the subterranean formation based, at least in part, on the received electrical signal;
removing the roller cone drill bit to a surface of the subterranean formation;
replacing the roller cone drill bit with an other roller cone drill bit having an other gamma ray detector; and
calibrating the other gamma ray detector with a power source removably coupled to the gamma ray detector.

19. The method of claim 18, wherein positioning at the end of the borehole in the subterranean formation the gamma ray detector comprises positioning at the end of the borehole in the subterranean formation a scintillator aligned with at least one of a photomultiplier, photodiodes, or phototransistors.

20. The method of claim 18, wherein the characteristic comprises at least one of a composition or geometry of the portion of the subterranean formation.

21. The method of claim 18, wherein receiving from the gamma ray detector the electrical signal further comprises receiving the electrical signal at a control unit communicably coupled to the gamma ray detector and positioned at least one of in the roller cone drill bit, within the borehole above the drill bit, and at the surface of the subterranean formation.

22. The method of claim 21, wherein receiving from the gamma ray detector the electrical signal further comprises transmitting the electrical signal from the control unit to an other control unit communicably coupled to the gamma ray detector.

23. The method of claim 21, wherein transmitting the electrical signal from the control unit to the other control unit communicably coupled to the gamma ray detector comprises transmitting the electrical signal over a short-hop telemetry system within the borehole.

24. The method of claim 21, further comprising generating at least one control signal corresponding to an operating decision made based on the determined characteristic.

25. The method of claim 24, further comprising transmitting the control signal to a steering system coupled to the drill bit.

26. The method of claim 18, wherein calibrating the other gamma ray detector comprises
outputting a range of output voltage levels from the power source; and
receiving measurements from the other gamma ray detector corresponding to the range of voltage levels and a material with a known energy spectra positioned proximate the end of the other roller cone bit; and
selecting an output voltage level from the range of output voltage levels based on the received measurements.

27. The method of claim 26, wherein the material with the known energy spectra is located in a bit breaker basket in which the other roller cone bit is at least partially positioned.

28. The method of claim 27, wherein the material contains a gamma ray emitting isotope.

29. The method of claim 18, wherein positioning at the end of the borehole in the subterranean formation the gamma ray detector comprises positioning at the end of the borehole in the subterranean formation a scintillator around which is wrapped a photosensor matrix with a graphene layer.

30. The method of claim 29, wherein the photosensor matrix with the graphene layer comprises a flexible surface that is wrapped around a scintillator more than once.

31. The method of claim 18, wherein the gamma ray detector comprises one or more layers of graphene.

* * * * *